United States Patent [19]

Evans

[11] Patent Number: 6,055,528
[45] Date of Patent: Apr. 25, 2000

[54] METHOD FOR CROSS-LINGUISTIC DOCUMENT RETRIEVAL

[75] Inventor: David A. Evans, Pittsburgh, Pa.

[73] Assignee: Claritech Corporation, Pittsburgh, Pa.

[21] Appl. No.: 08/900,642

[22] Filed: Jul. 25, 1997

[51] Int. Cl.[7] .................................................. G06F 17/30
[52] U.S. Cl. ....................................... 707/3; 707/4; 707/5
[58] Field of Search ......................................... 707/3, 4, 5

[56] References Cited

U.S. PATENT DOCUMENTS

| | | | |
|---|---|---|---|
| 5,278,980 | 1/1994 | Pedersen et al. | 395/600 |
| 5,301,109 | 4/1994 | Landauer et al. | 364/419.19 |
| 5,497,319 | 3/1996 | Chong et al. | 364/419.02 |
| 5,535,120 | 7/1996 | Chong et al. | 364/419.03 |
| 5,675,819 | 10/1997 | Schuetze | 395/760 |
| 5,694,523 | 12/1997 | Wical | 395/12 |
| 5,694,592 | 12/1997 | Driscoll | 395/603 |
| 5,696,962 | 12/1997 | Kupiec | 395/604 |
| 5,724,571 | 3/1998 | Woods | 707/5 |
| 5,761,631 | 6/1998 | Nasukawa | 704/9 |

*Primary Examiner*—Paul R. Lintz
*Assistant Examiner*—Cheryl Lewis
*Attorney, Agent, or Firm*—Jones, Day, Reavis & Pogue; Blaney Harper

[57] ABSTRACT

The present invention provides a method and apparatus for retrieving documents that are stored in a language other than the language that is used to formulate a search query. This invention decomposes the query into terms and then translates each of the terms into terms of the language of the database. Once the database language terms have been listed, a series of subqueries is formed by creating all the possible combinations of the listed terms. Each subquery is then scored on each of the documents in the target language database. Only those subqueries that return meaningful scores are relevant to the query. Thus, the semantic meaning of the query is determined against the database itself and those documents in the database language that are most relevant to that semantic meaning are returned.

10 Claims, 7 Drawing Sheets

```
\*
# 1
\#
BW REPORT #22:
\#
\!
-1 (PA VIEW) ( ) T
-1 (IS) ( ) V
-1 (COMPARED) ( ) V
-1 (TO) ( ) P
-1 (PREVIOUS EXAMINATION) ( ) T
-1 (DATED) ( ) V
-1 (10 22 91) ( ) X
\$
-1 (SURGICAL CLIP) ( ) T
-1 (ARE) ( ) V
-1 (AGAIN) ( ) A
-1 (SEEN) ( ) V
-1 (ALONG) ( ) P
-1 (RIGHT MEDIASTINUM) ( ) T
-1 (AND) ( ) C
-1 (RIGHT HILAR REGION) ( ) T
\$
-1 (ARE) ( ) V
-1 (NEW SURGICAL CLIP) ( ) T
-1 (IN) ( ) P
-1 (DISTRIBUTION) ( ) T
-1 (OF) ( ) P
-1 (CIRCUMFLEX ARTERY) ( ) T
-1 (AS WELL AS) ( ) C
-1 (4 INTACT STERNOTOMY WIRE) ( ) T
\$
-1 (IS) ( ) V
-1 (PERSISTENT INCREASED RIGHT PARAMEDIASTINAL OPACITY) ( ) T
-1 (POSSIBLY) ( ) A
-1 (RELATED) ( ) V
-1 (TO) ( ) P
-1 (PREVIOUS RADIATION THERAPY) ( ) T
\$
-1 (NEW PLATE LIKE OPACITY) ( ) T
-1 (ARE) ( ) V
-1 (SEEN) ( ) V
```

*FIG 3*

METHOD FOR CROSS-LINGUISTIC DOCUMENT RETRIEVAL

FIELD OF THE INVENTION

The present invention relates to the field of computerized information search and retrieval systems. More particularly, this invention relates to a method and apparatus for retrieving documents in languages other than the language of the search query.

BACKGROUND OF THE INVENTION

Due to rapid advances made in electronic storage technology, documents are increasingly being stored on electronic computer devices. Not only are documents being generated in the first instance in computer readable form, but documents that have heretofore existed only on paper are now being scanned for the purpose of taking advantage of the many benefits that electronic storage units have to offer. One of the principal advantages associated with electronic storage is that previously printed materials that formerly occupied a tremendous amount of space can now be stored in much less space. Also, electronic databases can be searched from locations around the world. This means that information stored in databases from many different parts of the world is widely available.

As a result of this worldwide activity, vast computerized databases of documents have been developed. However, many documents that exist in these collections appear in languages that the user of the database is not familiar with. This makes the retrieval of many relevant documents cumbersome if not impossible using conventional computer search techniques. This is because conventional search techniques rely on the ability of the user to create a query that is useful in the database. Since users may not be familiar with the language of particular databases, those databases are not accessible to such users by conventional techniques. As a result, substantial efforts have been directed to developing procedures by which search queries crafted in one language could be used to retrieve relevant documents existing in another language.

Conventional techniques for retrieving foreign language documents simply use a translator or a machine translation system to translate the user's query. These systems attempt to generate a foreign language query that captures the semantic meaning of the query in the language of the user. Since many words or phrases do not translate directly into other languages, the translation system must choose the phrase or phrases as they are used in context in the language of the database that most closely match the semantic meaning of the query. Relying on the translation system to provide this semantic meaning is often a mistake which results in retrieving irrelevant documents. More importantly, this mistake results in not retrieving the most relevant documents. A further disadvantage of machine translation systems is that they are difficult to create and, even when they operate properly, they make mistakes. As a result, they are difficult to use. The problems associated with these retrieval methods highlight the need for the user to be able to retrieve relevant foreign documents without knowledge on the part of either the user or the retrieval system of the semantic meaning of the query in a foreign language.

OBJECTS OF THE INVENTION

It is an object of the present invention to provide a method of retrieving documents from a database.

It is another object of the present invention to provide a method for retrieving relevant documents from a database in which documents are stored in a foreign language.

It is still another object of the present invention to provide a method for retrieving relevant documents from a foreign language database without relying on a semantic translation of a query.

It is still a further object of the invention to provide a method for retrieving relevant documents that is adaptable to many different foreign languages without relying on a semantic translations of a query.

SUMMARY OF THE INVENTION

The present invention provides a method and apparatus for retrieving documents that are stored in a language other than the language that is used to formulate a search query. This invention decomposes the query into terms and then translates each of the terms into terms of the language of the database. Once the database language terms have been listed, a series of subqueries is formed by creating all the possible combinations of the listed terms. Each subquery is then scored on each of the documents in the target language database. Only those subqueries that return meaningful scores are relevant to the query. Thus, the semantic meaning of the query is determined against the database itself and those documents in the database language that are most relevant to that semantic meaning are returned.

BRIEF DESCRIPTION OF THE DRAWINGS

The invention will be described in detail with reference to the following drawings:

FIG. 3 is a listing of parsed text according to the present invention.

DETAILED DESCRIPTION OF THE INVENTION

Figure 1:
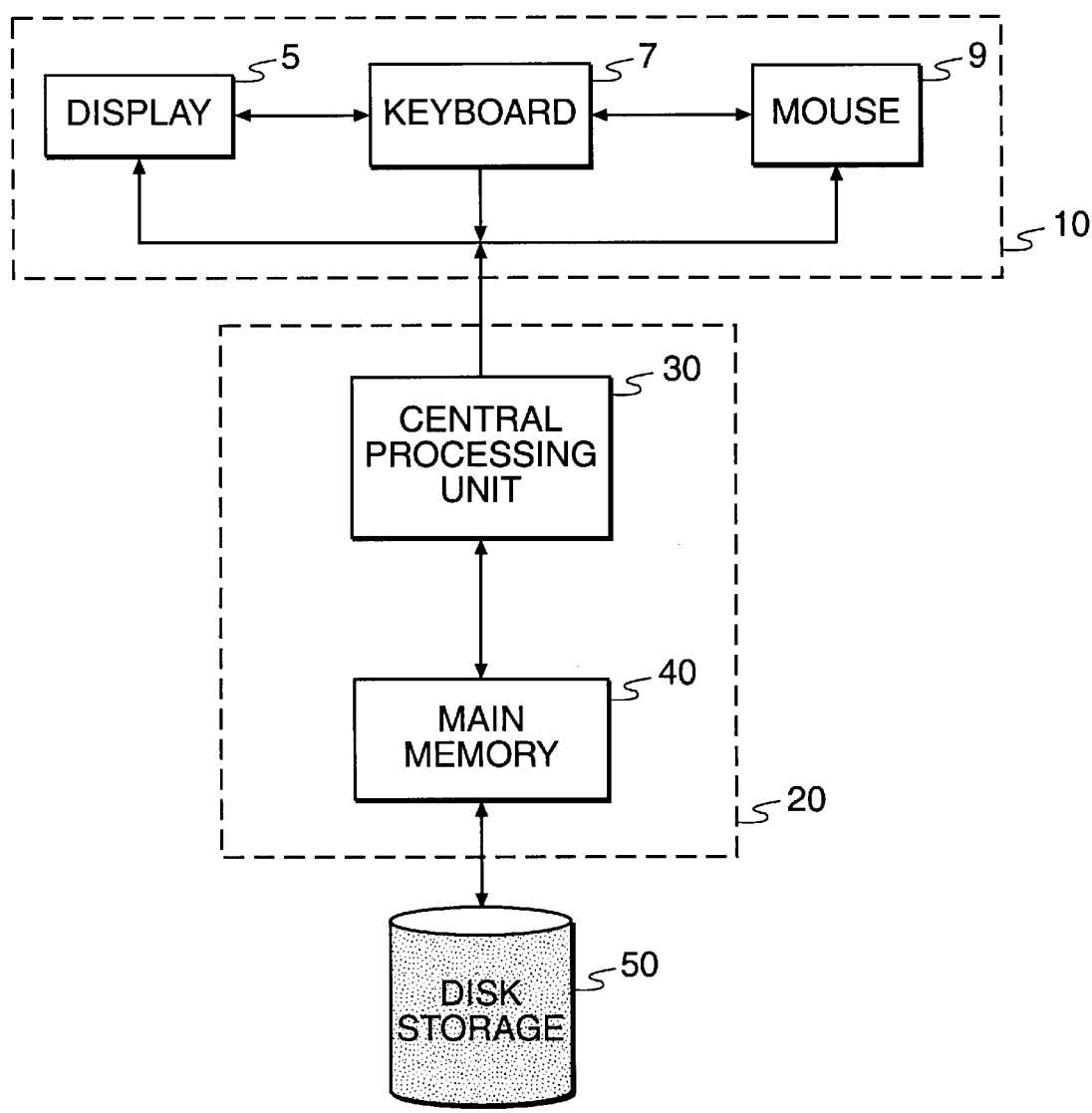
FIG. 1 is a block diagram that illustrates a computer system for document retrieval according to one embodiment of the present invention.

FIG. 1 is a block diagram of a computer system used for retrieving information from a database. Computer 20 comprises a central processing unit (CPU) 30 and main memory 40. Computer 20 is connected to an Input/Output (I/O) system 10 and disk storage unit 50. The I/O system 10 includes a display 5, a keyboard 7 and a mouse 9. In general, the disk storage unit 50 stores the program for operating the computer system and it stores the documents of the database. The computer 20 interacts with the I/O system 10 and the disk storage unit 50. The computer 20 executes a search program that is retrieved from the disk storage unit 50. The search program contains a series of instructions that cause the computer 20 to retrieve the text of documents, or parts thereof, which are stored in the database and that are the most relevant to a query. The query is be created and sent to the computer in a variety of ways. The query can be typed into keyboard 7 or selected from a predefined list by operating the mouse 9. Also, the search program can generate a query automatically.

The computer 20 responds to the query by retrieving documents from the database in the disk storage unit 50 and analyzing all of them to determine their relevance to the query. During the analysis process the computer 20 interacts with the disk storage unit 50 to create a series of subqueries in the language of the database, to create a series of subdocuments for each document in the database and to compute a score for each subdocument based on the subqueries. The computer 20 then selects the subdocuments that are most relevant to the initial query. The computer 20 then uses this information to create a list or otherwise retrieve the text of the most relevant subdocuments and/or their associated documents and transmits that text to the I/O unit 10.

Figure 2:
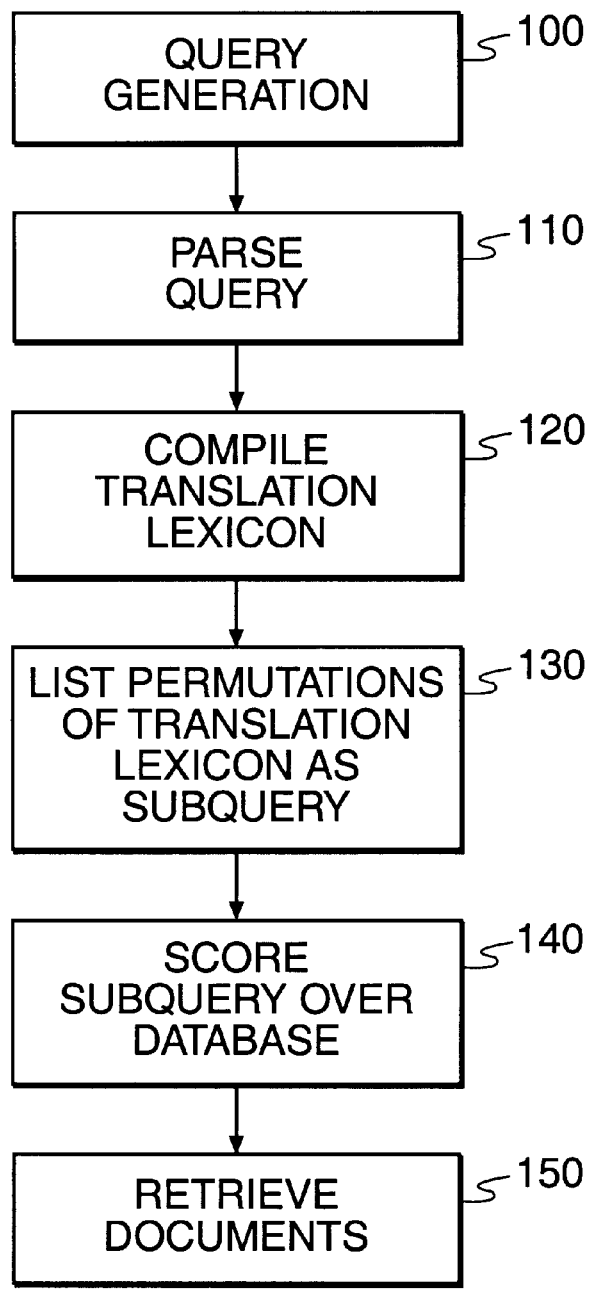
FIG. 2 is a flowchart that illustrates a process for operating a computer system for document retrieval according to the present invention.

FIG. 2 is a flow chart that illustrates the general operation of a computer system as illustrated in FIG. 1 according to the present invention. Step 100 initially generates a query in a form useful for processing in the computer. A simple way to generate such a query is to manually type in a query (through keyboard 7) in a language familiar to a user. Another technique suitable for generating a query is to merely highlight (through a conventional graphical user interface using a mouse 9) a certain passage of text in a document that a user is currently working on or viewing. After this text is highlighted, a function key (associated with I/O 10) is depressed to extract that text from the existing document for use as a query.

After the query is generated in step 100, the query is parsed in step 110. The parsing process can be as simple as merely listing each word in the query. Step 110 uses a more complex process in which the query is parsed into noun phrases. This can be accomplished by a variety of techniques known in the art such as the use of lexicons, morphological analyzers or natural language grammar structures. FIG. 3 is an example listing of text that has been parsed for noun phrases. As is evident from the list on FIG. 3, the phrases tagged with a 'T' are noun phrases, those tagged with a 'V' are verbs, those tagged with an 'X' are quantities and so on.

After the query has been parsed, Step 120 compiles a series of translation alternatives (translation lexicon) for each noun phrase. This is performed in two ways. First, each word in the query list can generally be translated into the language of the database in several different ways. For example, each term in the phrase "advanced information retrieval techniques" can be translated into German in the following manner:

| Term:<br>Translation: | Advanced | Information | Retrieval | Technique |
|---|---|---|---|---|
| | fortgeschritten | Auskunft | Zurückholen | Technik |
| | höher | Verkehrsbüro | Hervorholen | Methode |
| | fortschrittlich | Informationsgehalt | Herausholen | |
| | anspruchsvoll | Auskunftsbeamte | Herunterholen | |
| | weiterentwickelt | Informationsverarbeitung | Rettung | |
| | | Informatik | Bergung | |
| | | Informatiker | Rükgewinnung | |
| | | Datenspeicherung | Abfragen | |
| | | Informationstechnik | Abrufen | |
| | | Informationstheorie | Wiedererlangen | |
| | | Informationsabruf | Wiedergutmachen | |
| | | | Wiedergutmachung | |

These translation alternatives are language specific and are stored in a file separate from the database itself. Step 120 generates a list in the language of the database of all the terms that could relate to each term of the query list. This translation lexicon is then used as the basis for Step 130.

The translation lexicon can be expanded because each noun phrase in the language of the query can have alternate meanings in that language. For example, the query "administration of drugs for patient care" has several terms that may have different meanings. The term "Administration" may mean a government organization or the application of drugs. Similarly, "care" may mean concern about a person or maintenance of a facility. A thesaurus file stored in disk storage 50 and accessible to the computer 20 maintains a general list of these various word associations for the specific language of the query. For each word in the query, associated words in the language of the query are compiled and merged into the existing query list and an expanded translation lexicon is generated for this expanded query list.

Step 130 generates a list of combinations of terms in the translation lexicon. These combinations are permutations of terms across categories of words. For example, the list of possible terms for the query "administration of drugs for patient care" may generate 12 terms for the query list wherein each term is in a separate category. The translation lexicon may then generate 27 terms that fall into these 12 categories. Step 130 then creates a list of permutations of lexicon terms based on one term from each of the 12 categories. Each of these permutations then becomes a subquery in Step 140.

Step 140 then analyzes the foreign language database for each of the subqueries listed in step 130. This analysis can take a variety of forms including a Boolean keyword search. The analysis technique for the present embodiment of the invention performs a vector space analysis of the database against each subquery. This analysis generates a quantitative measure of the relation between the documents in the foreign language database and the subquery. More specifically, a similarity score between each of the documents in a database and each subquery can be computed by evaluating the shared and disjoint features of the subquery and the document over an orthogonal space of T terms of the document. One such computation makes use of the following scoring algorithm:

$$S(Q_i, D_j) = \frac{Q_i \cdot D_j}{|Q| \cdot |D|} = \frac{\sum_{k=1}^{t}(q_{i_k} \cdot d_{i_k})}{\sqrt{\sum_{k=1}^{t} q_{i_k}^2} \cdot \sqrt{\sum_{k=1}^{t} d_{i_k}^2}}$$

where $Q_i$ refers to terms in the query and $D_j$ refers to terms in the document.

Figure 4:
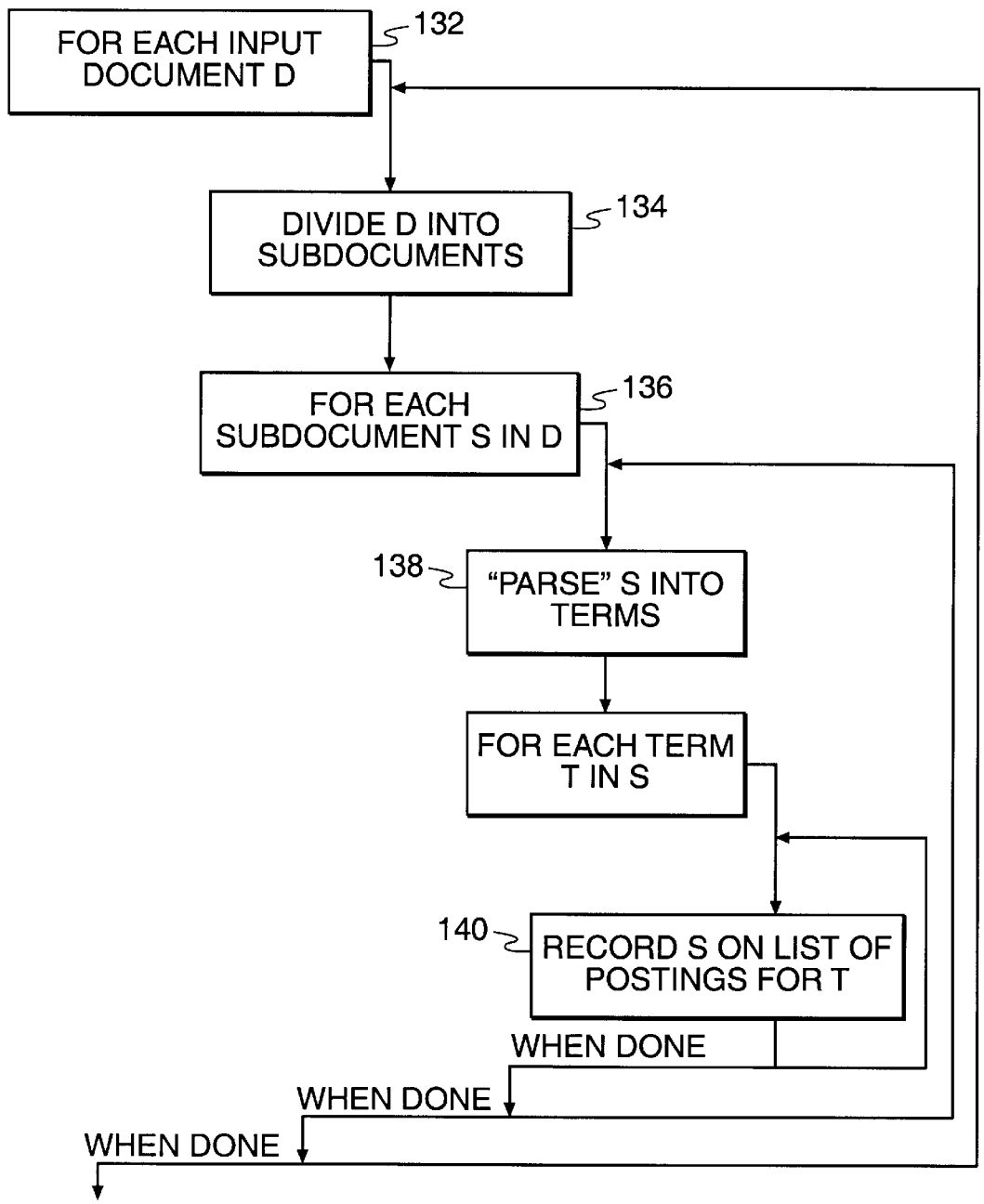
FIG. 4 is a flowchart that illustrates a process for inverting a database.

In the process for scoring the database, the database is initially inverted. The process for inverting a database is illustrated in FIG. 4. The first step in the inversion process 232 is to select a document from a database. In step 234, the documents in the database are divided into subdocuments. There are two types of subdocuments created in the process of FIG. 4. The first type of subdocument is a paragraph subdocument. These are generally created by making each paragraph in the document its own subdocument. Long paragraphs may consist of multiple subdocuments and several short paragraphs may be included in a single subdocument. The subdocuments all have approximately the same length.

Figure 5:
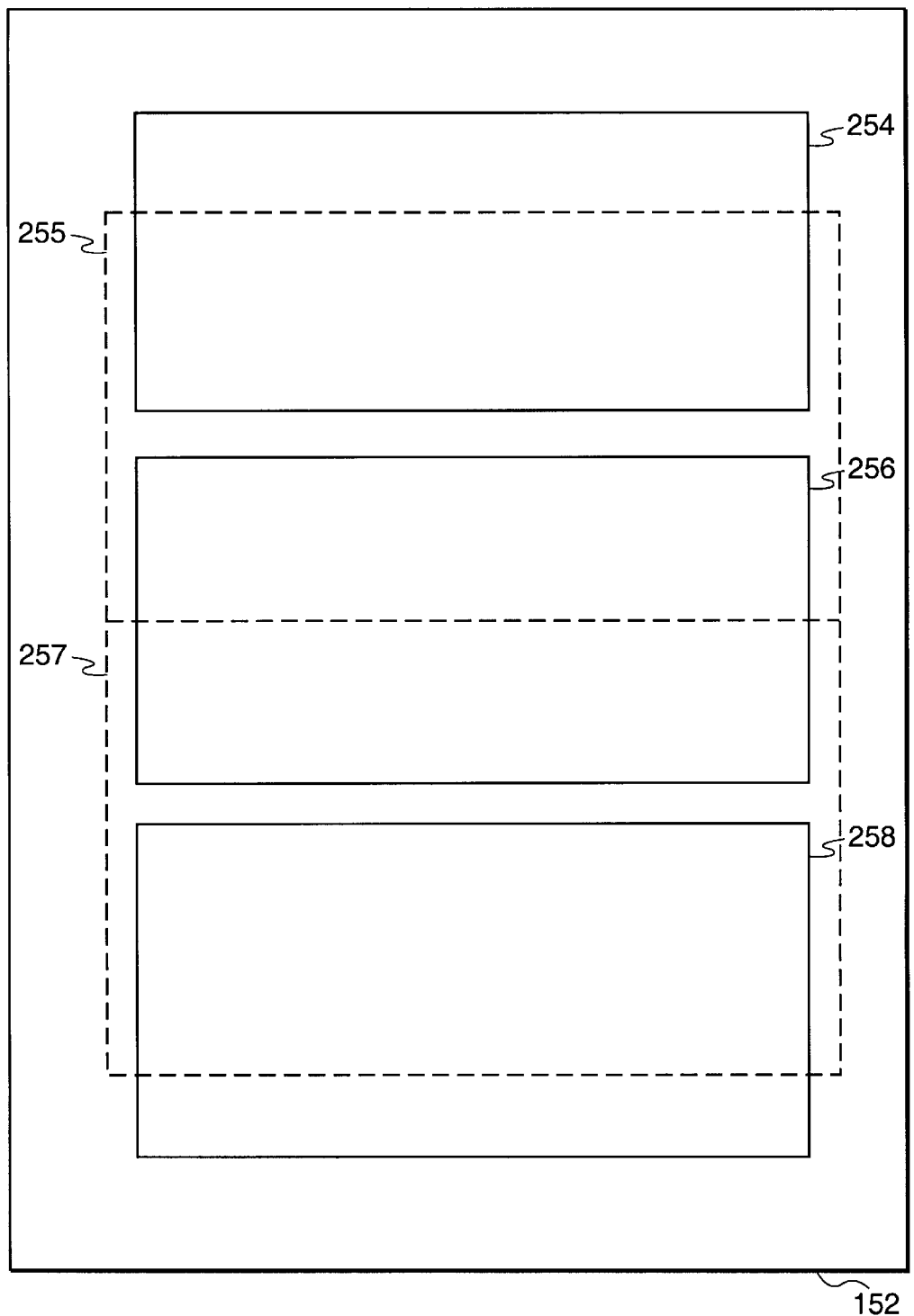
FIG. 5 is an illustration that depicts the creation of subdocuments according to the present invention.

The second type of subdocument created by step 234 of FIG. 4 is an overlapping subdocument. FIG. 5 is a schematic representation of how an overlapping subdocument is created. In particular, the text of a document is initially divided up into three mutually exclusive paragraph subdocuments 254, 256 and 258. Subdocuments 255 and 257 are also created. Subdocument 255 overlaps part of subdocuments 254 and 256. Similarly, subdocument 257 overlaps part of subdocuments 256 and 258. The overlapping subdocuments span the breaks in the paragraph subdocuments. Also, they are mutually exclusive and do not leave any parts of the document text uncovered. The overlapping subdocuments also use the midpoint of the paragraph subdocuments as their boundaries. In this way the overlapping subdocuments are approximately the same size as the paragraph subdocuments.

As a result of step 234 of FIG. 4, each term of the document is assigned to two types of subdocuments, a paragraph subdocument and an overlapping subdocument. Once the subdocuments have been created, all of the subdocuments are parsed in Steps 236 and 238. In this example, the parsing process is the same noun phrase parsing process used for the query. Once the subdocuments have been parsed, a term list containing subdocument noun phrases and the identity of the subdocuments in which the noun phrases appear is generated in Step 240. All the subdocuments for each document are processed in this way and the list of terms and subdocuments is updated. Finally, all the documents of a database are processed according to Steps 232–240. The result of this inversion process is a term list identifying all the terms (specifically noun phrases in this example) of a database and their associated subdocuments.

Figure 6:
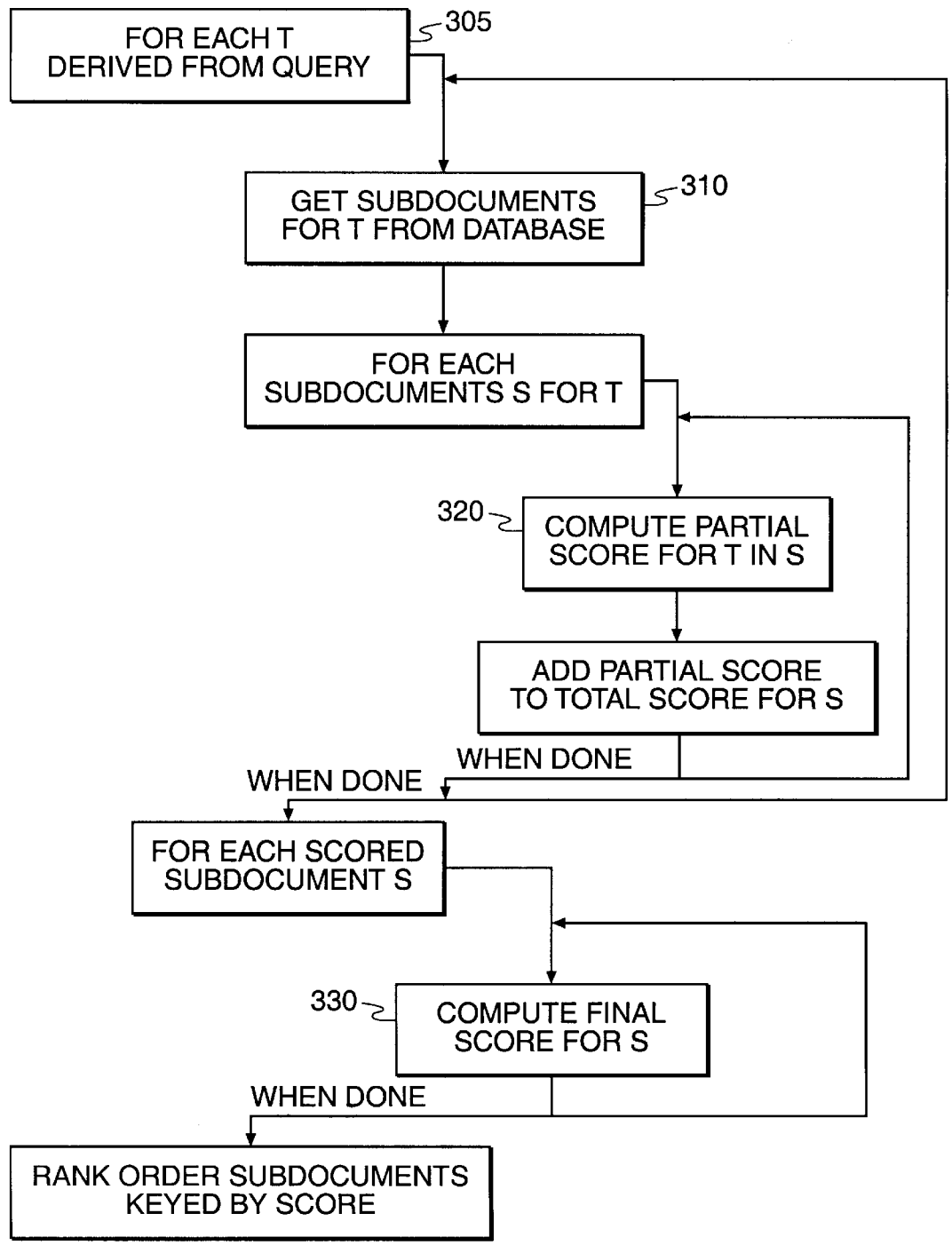
FIG. 6 is a flowchart that illustrates a process for scoring subdocuments according to the present invention.

Once the database has been inverted, subdocuments can be scored. The process for scoring the subdocuments is illustrated in FIG. 6. Initially, in step 305, a term is selected from the first subquery. In Step 310, the identity of all the subdocuments in which that term appears are returned from the inverted database. For each of these subdocuments, a similarity score for the query term and the subdocument is computed in Step 320 according to the general scoring formula described above. These similarity scores for all the subdocuments are computed and summed over all the subquery terms. A final score for each subdocument relating to the initial subquery is generated in Step 330. This process is repeated for each subquery.

After each subdocument has been scored for each subquery, the subdocuments are rank ordered by score in step 340. Most of the scores for the subqueries and subdocuments will be very low. This is because most of the permutations of the terms in the translation lexicon result in a nonsensical combination. However, some scores on subqueries and subdocuments will be much higher than the normal (noise) level. This is because some permutations of the translation lexicon terms will have relevance based on the documents in the database. The scores associated with these subdocuments indicate which documents are relevant to the initial query. These scores also indicate which permutations of the translation lexicon capture the semantic meaning of the query in the language of the database. The scores of the subdocuments identify the documents related to the query even though the user who created the query in a first language had no advance knowledge of the language of the documents in the database.

Once the documents in the foreign language database have been identified, they can be displayed to the user. Since the user normally has no knowledge of the language of the document, the foreign language text that is returned is highlighted for the specific terms or phrases that formed the subquery. In particular, the highlighting for a direct translation of the initial query may be different from alternate translations. Also, the display of the foreign language document is useful so that the user can see graphics or particular nontextual identifying characteristics of the document. More generally, the identified documents can be displayed as a list or simply printed out so that they can then be translated at a later time in a conventional translation process.

Figure 7:
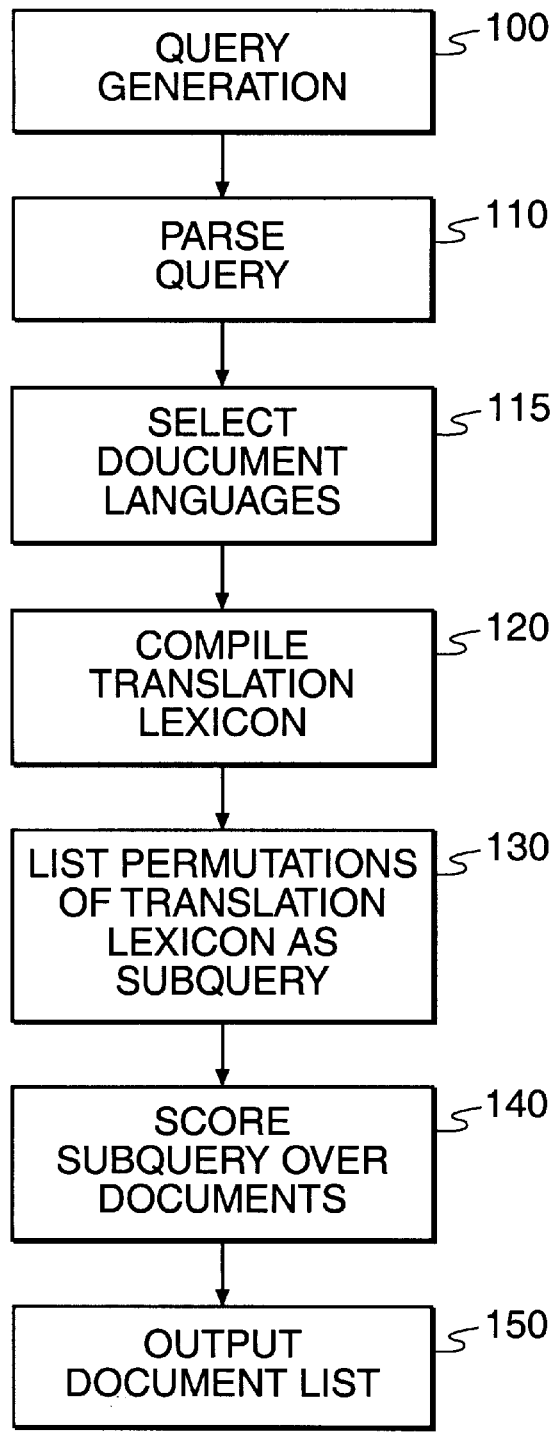
FIG. 7 is a flowchart that illustrates another process for operating a computer system for document retrieval according to the present invention.

Since the identification of documents in the process of FIG. 2 is independent of the language of the database, the process illustrated in FIG. 2 can be used to search a database having documents stored in multiple languages. FIG. 7 illustrates a process for searching a database having documents stored in multiple languages. The process illustrated in FIG. 7 is substantially the same process as illustrated in FIG. 2 except that the translation lexicon is expanded to include more than one language. Specifically, step 115 selects the languages that are to be included in the translation lexicon. This selection of languages could be made by the user who generates the query. Step 115 could also make this selection automatically to include all the languages for which a translation lexicon file is stored and accessible to the computer (as discussed above, the translation lexicon can also be expanded by a thesaurus file). Step 120 of FIG. 7 is then modified from that in the process of FIG. 2 so as to generate translation lexicons for each language selected in step 115. Once the expanded translation lexicon is generated, the rest of the process of FIG. 7 operates as in the process illustrated in FIG. 2.

The result of the process of FIG. 7 is that documents from the database that exist in any of the languages selected in step 115 and that relate to the query are identified and returned to the user. This occurs even though the user has no advance knowledge of the set of languages used by documents in the database. This result will occur even if documents in the database exist in multiple languages. This is because the translation lexicon includes a plurality of languages and the generation of subqueries merely forms permutations of the terms in the translation lexicon. The subquery generation process does not distinguish between terms in different languages. As a result, those documents with the highest scores relating to subqueries in any language will be returned.

While this invention has been particularly described and illustrated with reference to a preferred embodiment, it will be understood by one of skill in the art that changes in the above description or illustrations may be made with respect to formal detail without departing from the spirit and scope of the invention.

I claim:

1. A method of retrieving documents from a database, comprising:

generating a query in a first language;

parsing said query into a plurality of terms;

translating said plurality of terms into a second language;

listing a plurality of permutations of said translated terms;

testing each of said permutations against each document of said database to generate a score indicating the relevance of each of said permutations to each of said documents; and retrieving documents from said database based on said score.

2. A method of retrieving documents from a database, as in claim 1, further comprising:

computing a score for each of said permutations of said translated terms against each document of said database having text in said second language wherein said score indicates a measure of relevance of each permutation to each document.

3. A method of retrieving documents from a database, as in claim 2, further comprising:

retrieving documents from said database based on said score.

4. A method of retrieving documents from a database, as in claim 2, further comprising:

sorting said scores of said permutations to identify the highest ranking permutation; and retrieving a document associated with said identified highest ranking permutation.

5. A method of retrieving documents from a database, as in claim 4, further comprising:

retrieving a plurality of documents in an order corresponding to an order generated by said sorting of said permutations.

6. An apparatus for retrieving documents from a database, comprising:

a computer coupled to a storage unit and to a display unit, said storage unit stores a database in at least one file;

said computer generates a query in a first language;

said computer parses said query into a plurality of terms;

said computer translates said plurality of terms into a second language corresponding to at least one language of the documents stored in said database;

said computer generates a listing of a plurality of permutations of said translated terms;

said computer tests each of said permutations against each document of said database to generate a score indicating the relevance of each of said permutations to each of said documents; and said computer retrieves documents from said database in said storage unit based on said score.

7. An apparatus for retrieving documents from a database, as in claim 6, wherein:

said computer computes a score for each of said permutations of said translated terms against each document of said database having text in said second language wherein said score indicates a measure of relevance of each permutation to each document.

8. An apparatus for retrieving documents from a database, as in claim 7, wherein:

said computer retrieves documents from said database based on said score.

9. An apparatus for retrieving documents from a database, as in claim 7, wherein:

said computer sorts said scores of said permutations to identify the highest ranking permutation; and said computer retrieves a document associated with said identified highest ranking permutation.

10. An apparatus for retrieving documents from a database, as in claim 9, wherein:

said computer retrieves a plurality of documents in an order corresponding to an order generated by said sorting of said permutations.

* * * * *